No. 669,802.  
A. NODON.  
Patented Mar. 12, 1901.
ELECTRICAL DEVICE FOR CONVERTING ALTERNATING CURRENTS.
(Application filed Sept. 6, 1900.)
(No Model.)
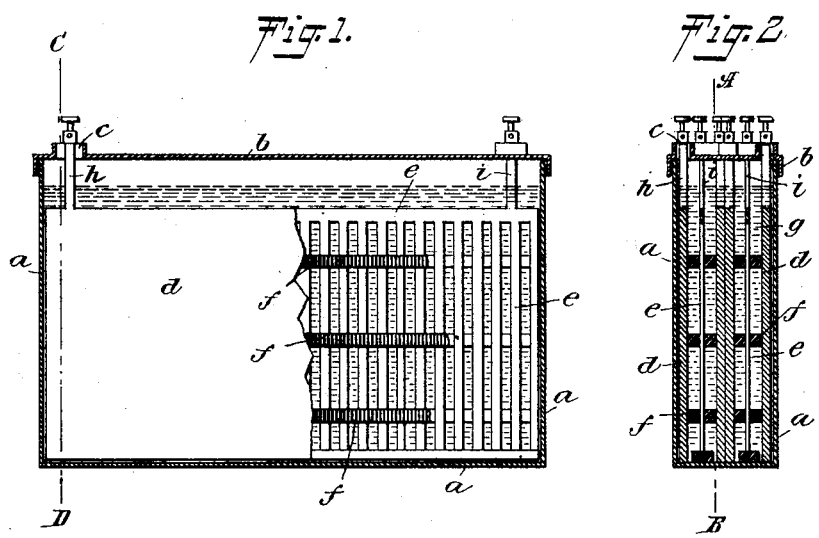
WITNESSES:  
William P. Goebel.  
John Lotka.
INVENTOR  
Albert Nodon.  
BY  
ATTORNEYS
THE NORRIS PETERS CO., PHOTO-LITHO., WASHINGTON, D. C.

UNITED STATES PATENT OFFICE.

ALBERT NODON, OF PARIS, FRANCE.

ELECTRICAL DEVICE FOR CONVERTING ALTERNATING CURRENTS.

SPECIFICATION forming part of Letters Patent No. 669,802, dated March 12, 1901.

Application filed September 6, 1900. Serial No. 29,180. (No model.)

*To all whom it may concern:*

Be it known that I, ALBERT NODON, a citizen of the French Republic, and a resident of Paris, France, have invented certain new and useful Improvements in Devices for Converting Alternating Electric Currents into Continuous Ones, of which the following is a full, clear, and exact specification.

My invention relates to electrical devices for the purpose of converting alternating currents, and is more particularly designed for use in connection with the traction of vehicles upon rails and for the transport of electromotive power at a distance.

My improved arrangement consists, essentially, of an electrolyte formed of a solution of phosphoric acid to which may or may not be added ammonia and in which are plunged two electrodes, the one of graphite or plumbago and the other of an alloy of zinc and aluminium. This electrolyte interpolated in an alternating circuit has the property of arresting one of the phases of the alternating current while allowing the other phase to pass freely. The phosphoric acid is the active substance of the electrolyte and forms insoluble salts with the zinc and aluminium of the alloy electrode. The addition of ammonia is useful owing to the protective action of this compound, which is passive—that is, it forms no soluble salts with the zinc and aluminium, but it preserves the alloy electrode from a too-strong attack by the phosphoric acid and insures a regular working of the apparatus. In order to effect the continuous converting of these two alternate phases, it suffices to arrange in parallel two similar couples having their electrodes disposed in a reversed order. In this manner it is possible to collect two direct and distinct currents corresponding, respectively, to each of the phases of the alternating current. It has been found by experiments that two similar couples organized in this manner permit of converting alternating currents having a mean electromotive force up to two hundred volts. By observing the phenomenon it will be seen, on the one hand, that the operation of the apparatus is accompanied with a deposition of hydrogen upon the metallic electrode and, on the other hand, that each of the converted currents possesses individually an electromotive force equal to half of the total electromotive force of the primary alternating current. The current thus converted may be utilized either separately—for example, for feeding arc-lamps and for charging accumulators—or simultaneously for operating electromotors. In the latter case the electromotor employed must be provided with a double winding of the field-magnets, the armature, and the two collectors, and its magnetic mass must also be divided, so as to avoid self-induction.

In order that my invention may be readily understood and carried into effect, I will describe the same fully, with reference to the accompanying drawings, which illustrate, by way of an example, an apparatus embodying my invention specially designed for converting an alternating current for use in the electrical traction of tramways.

Figure 1 is a longitudinal section of the said apparatus, taken on the line A B of Fig. 2; and Fig. 2 is a vertical cross-section of the same, taken on the line C D of Fig. 1.

My improved apparatus is composed of a vessel $a$, of sheet-iron, covered with enamel or other coating unaffected by the phosphoric acid. This vessel is closed, preferably, by a hermetic cover $b$, perforated with holes designed to allow passage of the pole-pieces and to permit the escape of the hydrogen formed at the surface of the metallic electrode. A convenient number (four in the example shown) of electrodes $dd$, of hard graphite, are arranged parallel in the vessel $a$ and comprising between them two electrodes $ee$ of an alloy of zinc and aluminium, separated therefrom by insulating-blocks $ff$. The two metallic electrodes $ee$ are made in the form of combs with the object of presenting a large active surface and of permitting the liquid to freely circulate. They are cut in pairs from a single plate of metal in such a manner as to prevent waste in the manufacture. All the electrodes are, as shown in the drawings, entirely immersed in the solution $g$. The pole-pieces $hh$ are made of graphite and paraffined, and the pole-pieces $ii$ are made of an alloy of zinc and aluminium covered with any appropriate insulating material.

Assuming, for example, that the alternate current for driving a tram-car has a mean energy of eight thousand to ten thousand watts at a difference of potential of five hundred volts, there will be required in all ten couples of devices similar to those hereinbefore described, and they are grouped in two parallel series of five couples, the two series having their respective poles arranged inversely to each other. With these conditions the weight of the alloy will be about five hundred grams and the total weight of the battery will not exceed two hundred and fifty kilograms. The passage of the current in the couples giving rise to a great development of heat, care will be necessary to so arrange the couples that a rapid circulation of air takes place between them during the travel of the vehicle, so as to maintain their temperature at as low a point as possible.

My improved electrical device for converting alternating currents into continuous ones possesses many advantages over those as heretofore constructed, among which may be mentioned lightness, derived from the use of high voltage, which it permits of supporting, and also from the low density of the materials of which it is composed, long life of the apparatus, due to the resistance to the chemical action which the graphite and the zinc-aluminium alloy possess in the presence of phosphoric acid, and low price, resulting mainly from the long life of the apparatus and the low cost of the materials of which it is composed.

I wish it to be distinctly understood that I do not limit myself strictly to the precise details of construction hereinbefore specified, as I may vary the construction in many ways without departing from the spirit of my invention.

What I claim, and desire to secure by Letters Patent of the United States, is—

1. In a device for converting alternating into continuous electric currents, the combination of an electrolyte formed of a solution of phosphoric acid with an addition of ammonia, with two electrodes immersed in the said electrolyte, one being formed of graphite or plumbago while the other is composed of an alloy of zinc and aluminium, substantially as hereinbefore described and for the purpose specified.

2. A device for converting alternating electric currents into continuous ones, comprising a supported electrolyte consisting of a solution of phosphoric acid, with an addition of ammonia, and electrodes in contact with said electrolyte.

3. A device for converting alternating electric currents into continuous ones, comprising a supported electrolyte, and two electrodes immersed therein, one of said electrodes being formed of graphite or plumbago, and the other of an alloy of zinc and aluminium.

In testimony whereof I have hereunto signed my name in presence of two subscribing witnesses.

ALBERT NODON.

Witnesses:
EDWARD P. MACLEAN,
GEORGES DELOM.